United States Patent [19]

Arrathoon

[11] 4,054,496
[45] Oct. 18, 1977

[54] PROCESS FOR THE PRODUCTION OF HIGH PURITY DEUTERIUM

[76] Inventor: Raymond Arrathoon, c/o Solaris Ltd., Rte. 1, Box 210B, Troy, Idaho 83871

[21] Appl. No.: 737,222

[22] Filed: Nov. 1, 1976

[51] Int. Cl.² .................. C25B 1/10; C25B 11/04; C25B 13/08
[52] U.S. Cl. .................. 204/129; 204/101; 204/257; 204/258
[58] Field of Search .............. 204/101, 129, 151, 257, 204/258

[56] References Cited

U.S. PATENT DOCUMENTS

| 3,930,151 | 12/1975 | Shibata et al. | 204/258 |
| 3,992,271 | 11/1976 | Danzig et al. | 204/129 |

FOREIGN PATENT DOCUMENTS

| 51,747 | 5/1936 | Denmark | 204/101 |
| 1,466,413 | 1/1967 | France | 204/129 |
| 973,820 | 10/1964 | United Kingdom | 204/129 |

*Primary Examiner*—F.C. Edmundson
*Attorney, Agent, or Firm*—Bauer, Amer & King

[57] ABSTRACT

A process for the electrolysis of heavy water which results in the production of high purity deuterium without periodic replenishment of the electrolyte with additional deuterated compounds is defined. Electrolysis is effected through the use of an inexpensive cation-action permselective membrane which is essentially a solid polymer electrolyte and which is capable of automatically separating the evolved deuterium and oxygen gas. This cation-active permselective membrane does not introduce any intrinsic impurities or tritium contamination in the generated deuterium gas, does not require periodic revitalization with deuterated compounds or other chemical compounds, and is characterized by an unusually high electrical efficiency.

5 Claims, 1 Drawing Figure

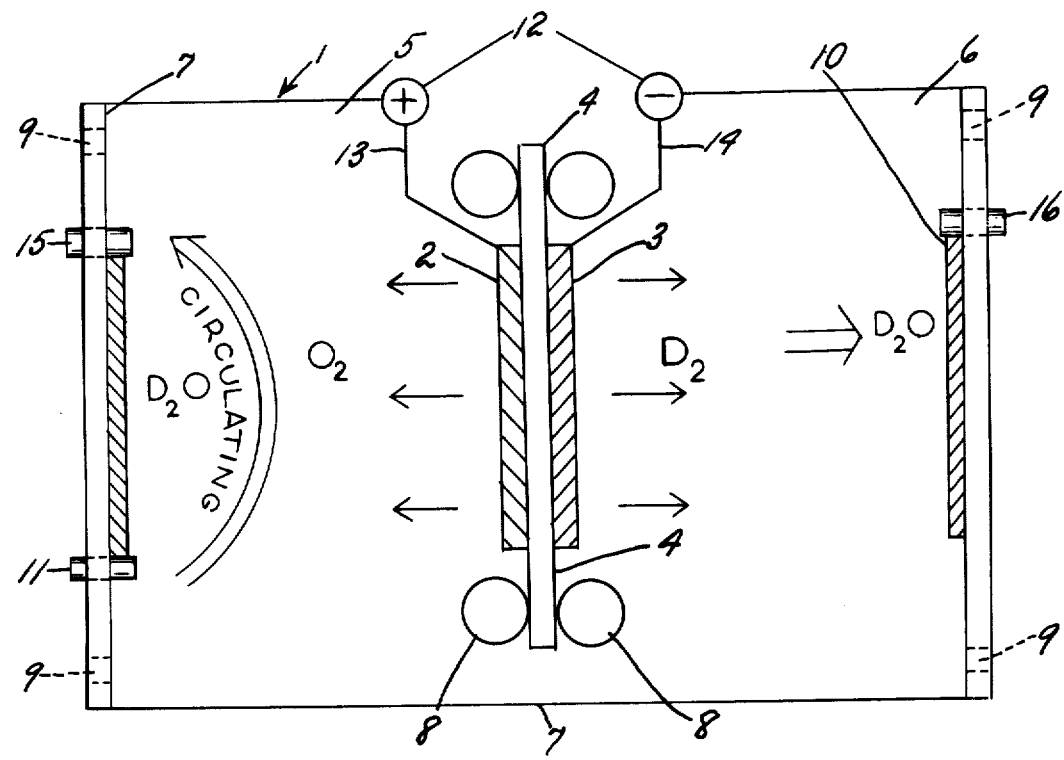

PROCESS FOR THE PRODUCTION OF HIGH PURITY DEUTERIUM

The present invention relates to the production of high purity deuterium from heavy water by a novel electrolytic process.

BACKGROUND OF INVENTION

The principal commercial process for the production of pure deuterium gas is the electrolysis of heavy water (reactor grade — 99.75% purity). In typical modern systems for the electrolysis of ordinary water the electrolyte is normally an alkaline hydroxide such as KOH. Alkaline hydroxide electrolytes are used in these units because of their good electrical characteristics and because they are particularly well suited to producing gas of high purity. When such a system is adapted for the production of pure deuterium ($D_2$) from deuterium oxide ($D_2O$), an alkaline deuteroxide (KOD) rather than an alkaline hydroxide is required in order to eliminate hydrogen contamination in the generated deuterium gas. This alkaline deuteroxide electrolyte must be replenished periodically as heavy water is consumed by the electrolysis unit. However, deuterated chemical compounds are costly and can add substantially to the cost of the generated gas.

SUMMARY OF INVENTION

It has now been found that the foregoing problem of periodically replenishing the deuterated electrolyte during the electrolysis of heavy water in the production of deuterium gas can be eliminated by the use of a cation-active permselective membrane as a solid polymer electrolyte. Said membrane is preferably processed only once in order to provide a non-contaminating solid electrolyte suitable for the production of high purity deuterium. No deuterated compounds, other than the usual heavy water feed, are required. The purity of the generated deuterium is limited only by the purity of the heavy water.

Accordingly, it is an object of the present invention to provide a new and improved method for producing high purity deuterium which is characterized by the utilization of a cation-active permselective membrane.

Another object of the present invention is to provide a process for automatically separating the generating deuterium gas from the oxygen gas during the electrolysis of heavy water.

Still another object of the present invention is the utilization of a cation-active permselective membrane to provide high electrical efficiency in the electrolytic separation of deuterium gas from oxygen gas during the electrolysis of heavy water.

Still another object of this invention is the utilization of a cation-active permselective membrane which, after the initial processing, does not introduce intrinsic impurities or tritium contamination or intrinsic hydrogen contamination into the generated deuterium gas.

Still another object of this invention is that the cation-active permselective membranes do not require periodic revitalization with additional deuterated chemical compounds or other chemical compounds to maintain electrolytic efficiency.

In accordance with the present invention, there is provided a process for the continuous production of high purity deuterium from heavy water which comprises introducing heavy water into the anode compartment of an electrolytic cell having an anode and cathode separated from each other by a cation-active permselective membrane which defines an anode compartment and a cathode compartment and which separates the liquids flowing on the anode side from the liquids on the cathode side. Both the anode and cathode may be platinum or palladium black, bright metal platinum mesh or wire cloth, platinum family metal mesh or wire cloth (ruthenium, rhodium, palladium, osmium, iridium, platinum), or coatings of these metals or coatings of oxides of these metals on conducting substrates of titanium, niobium or tantalum. Heavy water is drawn from a reservoir and is circulated and recirculated about the anode compartment. The heavy water is electrolyzed by the application of a direct current potential difference across the electrodes so that oxygen is evolved at the anode while deuterium is generated at the cathode, said generated deuterium gas and oxygen gas being automatically separated from each other by the cation-active permselective membrane.

More specifically, this invention relates to a process for the continuous production of high purity deuterium gas which comprises subjecting heavy water to electrolysis in an electrolytic cell containing a metallic anode and a metallic cathode separated by a cation-active permselective membrane which selectively permits hydrated deuterium ions to pass through said membrane to the cathode, applying a sufficient voltage across the membrane, so that the heavy water is completely electrolyzed and deuterium gas is evolved at the cathode and oxygen gas is evolved at the anode, and recovering high purity deuterium from the cathode.

The present invention will be more readily understood from the following description taken together with the drawing, wherein FIG. 1 represents a diagrammatic cross-sectional view of a single electrolytic cell.

Electrolytic cell 1 is formed by pressing a metallic anode 2 and metallic cathode 3 against each side of a cation-active permselective membrane 4, thereby dividing the cell into an anode compartment 5 and cathode compartment 6. Support structures 7 for electrolytic cell 1 are bolted tightly against gaskets 8 via bolt openings 9. A waffle iron type surface 10 or heavy wire cloth type structure is preferred to allow transverse liquid flow.

The metallic cathode and anode electrode materials are preferably of platinum or palladium black or of high quality platinum family metal mesh or wire cloth which do not add appreciably to the voltage drop across the membrane or form metallic hydroxides which may attack the acidic (cation-action permselective) membrane 4. For similar reasons, the support structure 7 is preferably made out of titanium, although niobium or tantalum would also be suitable. Where the titanium presses against the electrodes 2 and 3 to make electrical contact with the cathode and anode, a thin film of platinum is bonded against the titanium prior to placement against the electrode materials in order to eliminate contact resistance. In general, only the anode electrode necessarily need be constructed of a platinum family metal. The cathode electrode can be constructed entirely from titanium, niobium, tantalum or even silver in order to effect some savings in capital cost. However, a platinized cathode does provide a slight improvement in electrical efficiency, thereby reducing operating costs. Membrane 4 resistivity requires that the electrode structure be carefully designed to maximize contact area. If a wire cloth or mesh structure is used for the electrodes, from $50 \times 50$ lines per inch to $500 \times 500$ lines per inch and preferably 100×100 lines per inch may be considered acceptable. During cell assembly this structure must be tightly pressed against the membrane to minimize applied voltage drops.

The cation-active permselective membrane 4 is essentially impervious to fluids and gases so that liquids flowing in the anode compartment 5 are effectively isolated from liquids and gases flowing in the cathode compartment 6. The cation-active permselective membranes utilized herein are essentially solid polymer electrolytes which selectively permit passage or diffusion of cations, and generally contain a multiplicity of sulfonate or sulfonic acid substituents or, in some instances, carboxylate or phosphonate substituents. Thus, positive ions, apparently by means of ion exchange with the ionogenic substituents on the polymer film, are able to pass through the polymer membrane, while other ions, of opposite sign, are unable to do so.

The preparation and structure of cation-active permselective membranes are discussed in greater detail in the chapter entitled "Membranes" in the "Encyclopedia of Polymer Science and Technology," published by J. Wiley and Sons, New York, 1968, at Vol. 8, pages 620 to 638, and in the chapter entitled "Synthetic Resin Membranes" in "Diffusion and Membrane Technology", by S. B. Tuwiner, published by Rheinhold Publishing Corporation, New York, 1962, at pages 200 to 206, the pertinent subjects matter of which references are hereby incorporated by reference. The following proprietary compositions are representative examples of various cation-active permselective membranes which may be tried in the practice of the present invention: Ionac MC 3142, MC 3235, and MC 3470 XL types-polysulfonate-substituted heterogeneous polyvinyl chloride, manufactured by Ritter-Pfaudler Corp., Permutit Division, Nafion XR type - hydrolyzed copolymer of perfluorinated olefin and a fluorosulfonated perfluorovinyl ether, manufactured by E. I. DuPont de Nemours and Company, Inc.: Nafion XR, modified Nafion XR treated on one side with ammonia to convert $SO_2F$ groups to $SO_2NH_2$, which are then hydrolyzed to $SO_2NHNa$; RAI Research Corporation membranes such as types 18ST12S and 16ST13S - sulfostyrenated perfluorinated ethylene propylene copolymers.

The preferred cation-active permselective membranes of the invention are the perfluorosulfonic acid polymers sold under the registered trademark "Nafion" and more fully described in a paper by W. G. F. Grot, G. E. Munn, and P. N. Walmsley, "Perfluorinated Ion Exchange Membranes," presented to the 141st National Meeting of the Electrochemical Society in Houston, Texas, on May 1972 and in a paper by D. J. Vaughan "'Nafion' An Electrochemical Traffic Controller" Dupont Innovation 4, #3, 10; Spring 1973, which are hereby incorporated by reference.

The perfluorosulfonic acid membrane known as "Nafion" is the copolymer of a sulfonated perfluorovinyl ether (PSEPVE)

$FSO_2 CF_2CF_2 OCF (CF_3) CF_2—OCF = CF_2$ and tetrafluorethylene (TFE) to give a perfluorocarbon sulfonyl fluoride copolymer. The molecular weight is indeterminate but the equivalent weight is about 900 to 1,600, preferably 1,100 to 1,400. This copolymer may be compression molded at high temperature and pressure to produce sheets or membranes which may vary in thickness from 0.02 to 0.5mm.

Heavy water is constantly circulated about the anode compartment 5 through an input feed opening 11 and an outlet 15 for oxygen gas and heavy water, at a flow rate of 300 cc per a minute to 3000 cc per minute per square foot of membrane 4. A direct current from a suitable source 12 is applied via conductors 13 and 14 which are connected to electrodes 2 and 3 respectively, such that the anode in cell 1 is at a more positive potential than the cathode. As in ordinary water electrolysis units, oxygen is evolved in the anode compartment 5, and deuterium is generated in the cathode compartment 6. Following Faraday's Law, the rate of gas generation is proportional to the total current flow from anode to cathode. Ionic conductivity is supplied by heavy hydrated deuterium ions $(D^+.xD_2O)$ which migrate towards the cathode from one $(SO_3^-)$ sulfonic acid group to the next $(SO_3^-)$ sulfonic acid group within the membrane 4. At the cathode, $D_2$ molecules are formed and the accompanying heavy water is released through outlet 16. The deuterium gas-heavy water mixture emerging from outlet 16 is collected in an external pressure vessel from which the heavy water is periodically drained and returned to the anode reservoir. Thus, it is apparent that the evolved deuterium is automatically separated from the oxygen gas simply by cation transfer across the membrane. There is thus a constant migration of high purity deuterium from the anode side of the membrane to the cathode side.

Automatic separation of the evolved deuterium from the oxygen gas is accomplished by applying a voltage of about 1.5 to 3.0 volts and preferably about 2.0 volts across the cation-active permselective membrane, at a maximum temperature of 95° C and preferably 50° C. to 70° C. The temperature is maintained at the desired level by the use of heat exchangers or by other suitable means. This voltage is sufficient to substantially electrolyze the heavy water input feed, so that deuterium gas and oxygen gas are evolved.

The net rate of water transfer across the membrane is slightly dependent on the operating temperature, about 20° C to 95° C and preferably 60° C, and the operating current density, of about 50 amps per square foot to 1,200 amps per square foot and preferably 800 amps per square foot. For example, in a deuterium production operation conducted at a temperature of 60° C, using external heat exchangers, and at a current density equal to 750 amps per square foot, heavy water is transferred across the membrane at a rate equal to about seven times the rate at which the heavy water is consumed through electrolysis. The feed water in the anode compartment is normally circulated at about one hundred times the rate at which heavy water is consumed through electrolysis. Under these conditions, the system also exhibits an unusually high electrical efficiency. Electrical efficiencies between 40 and 90% and typically 60% are readily obtainable.

It is preferable to process the membrane, prior to its use in the production of high purity deuterium in order to provide a non-contaminating cation-active membrane. The membrane is preferably pretreated by boiling in pure heavy water for approximately ½ hour. Subsequently, the membrane is used to electrolyze pure heavy water at a temperature of 60° C and at a minimum current density of 750 amps per square foot for at least 24 hours. The membrane may then be considered fully equilibrated and releases no hydrogen other than that contained in the heavy water input feed. More specifically, no intrinsic impurities, tritium, hydrogen or other ions, are then released by the pretreated membrane during all subsequent operations for the production of high purity deuterium. Consequently, no further processing of the membrane is ever required and no periodic revitalization of the cation-active permselective membrane with costly deuterated compounds or other chemical compounds is necessary. For example, "Nafion EW 1200" has already been used for 3,000 continuous hours of heavy water operation in this laboratory and shows a projected life expectancy of over 15,000 hours. Operation was conducted at a higher current density than would be encountered in the operating conditions described earlier, namely a minimum of 750 amps per square foot in these tests at a regulated temperature of 60° C. The primary factor limiting the useful life of the "Nafion" appears to be the presence of dissolved metallic ions in the input feed water. The metallic ions tend to form metallic hydroxides which attack the acidic membrane. This effect was almost entirely eliminated by inserting a deionizer in the circulating loop through which the feed or input water passes. A mixed-bed deionizer was used in order to eliminate any possible anion impurities as well. Since "Nafion," like most plastics, is now being mass produced in large rolls (and even tubes), the ultimate lifetime of these membranes is probably a minor consideration from an economic point of view. Moreover, in accordance with conventional dialysis cell technology many such membranes can easily be stacked on top of each other, each with the appropriate set of gaskets, and electrodes, to provide many times the capacity of a single cell unit, all of said units being fed from a common anode reservoir.

This new electrolytic process of producing high purity deuterium from heavy water is very efficient and is preferably used with reactor grade, heavy water, thereby replacing the costly use of deuterated chemical compounds in present day commercial processes.

Although the present invention has been described with respect to a specific embodiment as illustrated, it is not limited thereto but it is intended to cover all modifications and equivalents evident to one skilled in the art without departing from the spirit of the invention.

What is claimed is:

1. A process for the continuous production of high purity deuterium gas which comprises subjecting heavy water to electrolysis in an electrolytic cell containing a metallic anode and a metallic cathode separated by a cation-active permselective membrane which selectively permits hydrated deuterium ions to pass through said membrane to the cathode, applying a sufficient voltage across the membrane so that the heavy water is completely electrolyzed and deuterium gas is evolved at the cathode and oxygen gas is evolved at the anode, and recovering high purity deuterium from the cathode.

2. A process in accordance with claim 1, wherein the anode is a platinum family metal.

3. A process in accordance with claim 1, wherein high purity heavy water is constantly recirculated about the anode.

4. A process in accordance with claim 1, wherein the cation-active permselective membrane is a perfluorocarbon sulfonyl fluoride copolymer.

5. A process in accordance with claim 4, wherein the membrane is pretreated in order to free it of intrinsic impurities, said membrane maintaining its electrolytic efficiency without requiring periodic revitalization treatments.

* * * * *